United States Patent
Hong et al.

(10) Patent No.: US 12,503,522 B2
(45) Date of Patent: Dec. 23, 2025

(54) METHOD FOR EXTRACTING DUCKWEED TURION STARCH

(71) Applicant: Jiangnan University, Wuxi (CN)

(72) Inventors: Yan Hong, Wuxi (CN); Xu Wang, Wuxi (CN); Zhengbiao Gu, Wuxi (CN); Yuzhen Jin, Wuxi (CN); Li Cheng, Wuxi (CN); Zhaofeng Li, Wuxi (CN); Caiming Li, Wuxi (CN); Xiaofeng Ban, Wuxi (CN); Qiwei Zhou, Wuxi (CN)

(73) Assignee: Jiangnan University, Wuxi (CN)

( * ) Notice: Subject to any disclaimer, the term of this patent is extended or adjusted under 35 U.S.C. 154(b) by 950 days.

(21) Appl. No.: 17/686,528

(22) Filed: Mar. 4, 2022

(65) Prior Publication Data

US 2022/0195073 A1  Jun. 23, 2022

Related U.S. Application Data

(63) Continuation of application No. PCT/CN2021/107376, filed on Jul. 20, 2021.

(30) Foreign Application Priority Data

Jan. 15, 2021  (CN) .......................... 202110052874.1

(51) Int. Cl.
  *C08B 30/04* (2006.01)
  *C08B 30/02* (2006.01)
(52) U.S. Cl.
  CPC .............. *C08B 30/04* (2013.01); *C08B 30/02* (2013.01)
(58) Field of Classification Search
  None
  See application file for complete search history.

(56) References Cited

FOREIGN PATENT DOCUMENTS

CN  1473822 A  *  2/2004
CN  104974264 A  10/2015
(Continued)

OTHER PUBLICATIONS

Adamec et al. "Mineral nutrients, photosynthetic pigments and storage carbohydrates in turions of 21 aquatic plant species." Aquatic Botany 165 (2020) 103238, pp. 1-9. (Year: 2020).*
(Continued)

*Primary Examiner* — William H. Beisner
(74) *Attorney, Agent, or Firm* — IPro, PLLC; Na Xu (57) ABSTRACT

The present disclosure discloses a method for extracting a duckweed turion starch, and belongs to the technical field of agriculture and food. The extraction method of the present disclosure includes the following steps: conducting drying and rehydration on a duckweed turion to obtain a rehydrated turion, soaking the rehydrated turion in a solvent, and then conducting washing and filtration to obtain a decolorized duckweed turion; or conducting beating on a fresh duckweed turion, soaking the fresh duckweed turion in a solvent, and then conducting washing and filtration to obtain a decolorized duckweed turion slurry; and putting the decolorized duckweed turion or the decolorized duckweed turion slurry in a dispersion liquid for extraction at a rotation speed of 6,000-18,000 rpm at 25-50° C. for 5-60 min, and then conducting filtration, centrifugation, washing and drying to obtain the duckweed turion starch. The turion starch obtained by using the method of the present disclosure has a high purity and a high extraction rate. The purity reaches 93% or above with the highest purity of 96.54% or above. The extraction rate reaches 85% or above.

7 Claims, 5 Drawing Sheets

(56) References Cited

FOREIGN PATENT DOCUMENTS

| | | | |
|---|---|---|---|
| CN | 107548982 A | | 1/2018 |
| CN | 112794920 A | | 5/2021 |
| JP | 2019014766 A | * | 1/2019 |
| WO | 2017090632 A1 | | 6/2017 |

OTHER PUBLICATIONS

Lui et al. "A submerged duckweed mutant with abundant starch accumulation for bioethanol production." GCB Bioenergy. 2020;12:1078-1091. (Year: 2020).*

Su et al. "Optimization of the Method for Chlorophyll Extraction in Aquatic Plants." Journal of Freshwater Ecology, vol. 25, No. 4—Dec. 2010. (Year: 2010).*

Takai et al. "Ethanol Production from Vegetative Fronds and Turions of Wolffia arrhiza." Japanese Journal of Water Treatment Biology vol. 50 No. 4 133-140 2014. (Year: 2014).*

Wong et al. "Extraction of Starch from Marine Microalgae, Chlorella salina: Efficiency and Recovery." International Journal of Environmental Research (2019) 13:283-293. (Year: 2019).*

Xu et al. "Turion, an innovative duckweed-based starch production system for economical biofuel manufacture." Industrial Crops & Products 124 (2018) 108-114 (Year: 2018).*

* cited by examiner

METHOD FOR EXTRACTING DUCKWEED TURION STARCH

TECHNICAL FIELD

The present disclosure relates to a method for extracting duckweed turionstarch, and belongs to the technical field of agriculture and food.

BACKGROUND

As the smallest angiosperm in the world, duckweed is mostly in morphology of a highly degraded flat membranous thallus in an oblong or obovate shape. The duckweed generally includes 5 genera, 40 species, including the genus *Spirodela*, the genus *Landoltia*, the genus *Wolffiella*, the genus *Lemna* and the genus *Wolffia*. The duckweed with high adaptation to the environment is widely distributed in lakes, ponds and other lentic waters all over the world. As a flowering plant with fastest growth and a high reproduction speed in the world, the duckweed can grow nearly exponentially and achieve double growth in 30 h under optimal conditions. Therefore, biomass accumulation of the duckweed is 2 times more than that of other flowering plants and conventional crops. According to different environments, the duckweed controls the lateral capsule meristem to form a thallus or a turion. When growing in an environment with nutritional deficiency and low temperature, the duckweed controls the lateral capsule meristem to form a turion. According to different varieties and growth environments, the duckweed turion has great differences in basic component which mainly includes starch and protein. Through induction of the turion under appropriate conditions, some varieties can achieve efficient accumulation of starch. Theoretically, more than 2 tons of starch can be produced by the duckweed per acre of water every year. In summary, the duckweed has the advantages of being high in starch content, easy to harvest, free of competition with grains for land and capable of achieving effective use of space in artificial breeding, and is a new starch resource with a high value.

In recent years, development and utilization of duckweed resources have become a research hotspot, mostly focusing on influence of growth environment (such as light, temperature, hormones, nutrients and heavy metals) on the growth of the duckweed, systematic classification of the duckweed, selection of specific varieties, genetic engineering of the duckweed and overall utilization of the duckweed (such as sewage treatment, bioreactors, energy utilization and feed utilization). There are few researches on specific components in the duckweed. In addition, the starch is widely used in the fields of medicine, food, cosmetics, feed, petroleum drilling, metal casting, textiles and papermaking. Therefore, a research on the duckweed turion starch has a great meaning.

SUMMARY

Technical Problems

Researches on turion starch are at an initial stage. There are no mature processes for extracting duckweed turion starch. It is found through retrieval that a method for extracting a turion starch by freezing and pulverization with liquid nitrogen is used in related patents, and the method is high in cost and difficult to industrialize. According to methods for extracting a duckweed turion starch in scientific papers, there are problems that the starch is impregnated with a pigment, the starch extraction rate is low, the purity is low and industrialization is difficult to realize. Therefore, it is urgent to develop a method for extracting a duckweed turion starch.

Technical Solutions

In order to solve at least one of the problems above, an organic solvent or an organic solution-water mixture is used in the present disclosure for conducting soaking decolorization on a duckweed turion, and then the duckweed turion starch is extracted with a dispersion machine. As the organic solution and water can enter cells of the turion and have a certain ability to dissolve a lipid-soluble pigment and a water-soluble pigment, most of the pigments in the duckweed turion can be removed, and impregnation of the starch with the pigments is reduced. At the same time, by conducting extraction with the dispersion machine, not only can the starch be separated from the cells of the duckweed turion, but also cell walls can be connected to facilitate centrifugal separation in a later stage.

A first objective of the present disclosure is to provide a decolorization method of a duckweed turion. The method includes the following steps:

conducting drying and rehydration on the duckweed turion to obtain a rehydrated turion, soaking the rehydrated turion in a solvent, and then conducting washing and filtration to obtain a decolorized duckweed turion.

In an embodiment of the present disclosure, impurity removal needs to be conducted before conducting drying on the duckweed turion and specifically includes harvesting the mature duckweed turion falling to the water bottom and then rubbing the duckweed turion to remove most of root in the turion.

In an embodiment of the present disclosure, the drying is conducted at 40-45° C. for 1-3 h. The drying includes blasting drying, airflow drying, low-temperature cryodesiccation, rotary flash drying, explosion puffing drying, vacuum rake drying, low-temperature thin-layer drying, continuous vacuum cryogenic liquid drying and flighted rotary drying. After the drying, the final moisture content of the turion is equal to or lower than 10%.

In an embodiment of the present disclosure, the drying is conducted to facilitate storage and transportation and change the permeability of the cells of the turion to facilitate decolorization and extraction in the later stage.

In an embodiment of the present disclosure, after the drying, secondary purification may be conducted with air separation equipment to remove remaining roots and thallus impurities.

In an embodiment of the present disclosure, the rehydration is conducted according to a material-to-liquid ratio of 1:(5-100) in g/mL at a temperature of 25-50° C. for 20-120 min. Further preferably, the rehydration is conducted according to a material-to-liquid ratio of 1:20 (w/v) at a temperature of 25° C. for 20 min.

In an embodiment of the present disclosure, the solvent with a concentration of 40-100% (v/v) includes, but is not limited to, ethanol, acetone, petroleum ether and dimethyl sulfoxide.

In an embodiment of the present disclosure, the soaking is conducted according to a material-to-liquid ratio of 1:(10-100) in g/mL at a temperature of 25-50° C. for 4-24 h.

In an embodiment of the present disclosure, the soaking may be conducted once or several times.

In an embodiment of the present disclosure, the duckweed turion is a turion with a high starch content, including but is not limited to the following varieties: *S. polyrhiza* ZH0196, *L. aequinoctialis* 6002, *L. aequinoctialis* LC33, *L. punctata* LC06, *S. polyrhiza* LC15 and *Landoltia* OT.

In an embodiment of the present disclosure, varieties of the duckweed belong to, but are not limited to, the genus *Spirodela*, the genus *Landoltia*, the genus *Wolffia*, the genus *Lemna* and the genus *Wolffiella*.

In an embodiment of the present disclosure, the filtration is conducted by using a filter bag; and the washing is conducted by using clear water.

In an embodiment of the present disclosure, the decolorization method includes the following steps:
(1) conducting harvesting, primary purification, drying and secondary purification on a duckweed turion, and then conducting rehydration on the duckweed turion to obtain a rehydrated turion, where the rehydration is conducted according to a material-to-liquid ratio of 1:(5-100) (w/v) at a temperature of 20-50° C. for 20-120 min; and
(2) draining the rehydrated turion, soaking the rehydrated turion in a solvent, and then conducting washing and filtration to obtain the decolorized duckweed turion, where the soaking is conducted according to a material-to-liquid ratio of 1:10 (w/v)-1:100 (w/v) at a temperature of 25-50° C. for 4-24 h.

In an embodiment of the present disclosure, the decolorization method of a duckweed turion further includes:
conducting beating, sieving and centrifugation on a fresh or dry rehydrated turion to obtain a precipitate, soaking the precipitate in a solvent, and then conducting centrifugation to obtain a decolorized turion slurry.

In an embodiment of the present disclosure, according to the decolorization method of a duckweed turion, the sieving is conducted with an 80-mesh sieve, and the centrifugation is conducted at 3,500 rpm for 10 min.

In an embodiment of the present disclosure, the decolorization method includes the following steps:
(1) conducting harvesting, purification, beating, sieving and centrifugation on a fresh or rehydrated duckweed turion to obtain a fresh duckweed turion slurry; and
(2) soaking the fresh duckweed turion slurry in a solvent, and then conducting washing and centrifugation to obtain a decolorized duckweed turion slurry, where the soaking is conducted according to a material-to-liquid ratio of 1:10 (w/v)-1:100 (w/v) at a temperature of 25-50° C. for 4-24 h.

In an embodiment of the present disclosure, the decolorization method includes the following steps:
conducting beating and sieving with an 80-mesh sieve on a fresh turion, and conducting centrifugation at 3,500 rpm for 10 min to obtain a fresh turion slurry; and
soaking the fresh turion slurry in an aqueous ethanol solution with a concentration of 85%, and after the soaking is completed, conducting centrifugation at 3,500 rpm for 10 min and washing with sufficient water twice to obtain a decolorized fresh turion slurry, where the soaking is conducted according to a material-to-liquid ratio of 1:5 (w/v) at a temperature of 50° C. for 20 min.

In an embodiment of the present disclosure, the beating is conducted to destroy the cell structure of the duckweed turion and facilitate decolorization and starch extraction.

A second objective of the present disclosure is to provide the decolorized duckweed turion and the decolorized turion slurry prepared by using the method of the present disclosure.

A third objective of the present disclosure is to provide a method for extracting the duckweed turion starch. The method includes the following steps:
putting the decolorized duckweed turion and the decolorized turion slurry of the present disclosure in a dispersion liquid for extraction at a rotational speed of 6,000-18,000 rpm at 25-50° C. for 5-60 min, and then conducting filtration, centrifugation, washing and drying to obtain the duckweed turion starch.

In an embodiment of the present disclosure, the extraction is conducted according to a material-to-liquid ratio of 1:(10-100) in g/mL.

In an embodiment of the present disclosure, the dispersion liquid includes, but is not limited to, water, ethanol and acetone.

In an embodiment of the present disclosure, one or more selected from the group consisting of cellulase, hemicellulase and pectinase may be selectively added into the dispersion liquid to improve the effect of separating the starch from the turion. The cellulase, the hemicellulase and the pectinase are added in an amount of 0.5-3.2 U/g, 0.6-2.4 U/g and 0.2-1.3 U/g respectively.

In an embodiment of the present disclosure, the extraction may be repeated several times according to an extraction rate and a sample purity.

In an embodiment of the present disclosure, the filtration is conducted with a 200-mesh sieve.

In an embodiment of the present disclosure, the centrifugation is conducted at 3,000-5,000 rpm for 10-50 min.

In an embodiment of the present disclosure, the washing is conducted with a 50-70% ethanol solution 1 to 5 times.

In an embodiment of the present disclosure, the drying is conducted at 40-50° C. until the moisture content is equal to or lower than 10%.

In an embodiment of the present disclosure, after the drying, pulverization and sieving with a 100-mesh sieve may be conducted to obtain the duckweed turion starch.

In an embodiment of the present disclosure, the method for extracting the duckweed turion starch includes the following steps:
putting the decolorized duckweed turion and the decolorized turion slurry in a dispersion liquid according to a material-to-liquid ratio of 1:(10-100) (w/v), and conducting extraction on an obtained turion-dispersion liquid system with a dispersion machine at a rotation speed of 6,000-18,000 rpm at a temperature of 25-50° C. for 5-60 min; conducting filtration on an extracted material liquid, conducting backfilling and dispersion on a filter residue several times, and collecting a filtrate several times; conducting natural settling and centrifugation on the filtrate collected several times to obtain a crude starch; and finally, conducting washing, drying, grinding and sieving on the crude starch to obtain the duckweed turion starch.

A fourth objective of the present disclosure is to provide the duckweed turion starch extracted by using the method of the present disclosure.

A fifth objective of the present disclosure is to provide application of the duckweed turion starch of the present disclosure in the fields of food, medicine, cosmetics, feed, petroleum drilling, metal casting, textiles and papermaking.

In an embodiment of the present disclosure, the application in the field of food includes, but is not limited to, application in steamed breads, breads, cakes, biscuits, noodles, fried bread sticks, rice noodles, fried dough twists, pancakes and blended rice.

In an embodiment of the present disclosure, the application in the field of food includes application in modified starch, and the application includes, but is not limited to, application in acid-modified starch, oxidized starch, cross-linked starch, esterified starch, etherified starch and graft copolymeric starch.

Beneficial Effects (1) In the present disclosure, the duckweed turion starch is extracted from a duckweed turion. Compared with common starch resources, the duckweed has the advantages of being high in starch content, free of competition with grains for land, capable of achieving large-scale and spatial breeding and high in yield. Therefore, development and utilization of the duckweed starch as a new resource have an extremely high commercial value.

(2) By using the method of the present disclosure, decolorization can be conducted on the duckweed turion, thereby reducing the impregnation of the turion starch with a pigment, so that the turion starch has improved whiteness.

(3) A decolorization liquid used in the method of the present disclosure is recyclable and high in economical efficiency.

(4) The turion starch obtained by using the method of the present disclosure has a high purity and a high extraction rate. The purity reaches 93% or above with the highest purity of 96.54% or above. The extraction rate reaches 85% or above with the highest extraction rate of 90.03% or above.

(5) The method of the present disclosure is simple in process, equipment is low in cost and easy to operate, and industrialization is easy to realize.

(6) The starch is widely used in the fields of medicine, food, cosmetics, feed, petroleum drilling, metal casting, textiles and papermaking. In addition, based on the high-purity turion starch extracted by using the method of the present disclosure, a foundation is laid for application of the turion starch in a next step, and the application of the turion starch is expanded.

DETAILED DESCRIPTION

Preferred embodiments of the present disclosure are described below. It should be understood that the embodiments are used to better explain the present disclosure, rather than to limit the present disclosure.

Test Methods:

1. Determination Method of Brightness

The brightness value L* of a sample is determined by using a high-precision colorimeter. An instrument is externally calibrated with a standard blackboard and a white board. A black color is recorded as 0, and a white color is recorded as 100. A No. 1 valve bag is used as a blank. 3 g of the sample (including the decolorized duckweed turion and a duckweed turion starch) is weighed, added into the No. 1 valve bag and then laid flat. Parallel determination is conducted 3 times to obtain an average value.

2. Determination Method of Whiteness

With reference to "GB/T 22427.6-2008 Determination of Starch Whiteness", a determination method of the starch whiteness is used.

3. Calculation of a Starch Extraction Rate $$ER = \frac{W1 \times A1}{W \times A} \times 100\%$$

In the formula, ER refers to the starch extraction rate with % as the unit; W1 refers to the mass of an extracted starch with g as the unit; W refers to the mass of a raw material with g as the unit; A1 refers to the purity of the extracted starch with % as the unit; and A refers to the purity of the raw material starch with % as the unit.

4. Test of Starch Purity:

With reference to an acid hydrolysis method in "GB 5009.9-2016 National Food Safety Standard Determination of Starch in Food", a determination method of the starch purity is used.

5. Observation of Starch Granules with an Optical Microscope

An extracted duckweed turion starch is prepared into a 1% (w/w) aqueous solution. One drop of the aqueous solution is dropped on a glass slide, covered with a cover glass and then observed under an optical microscope (natural light and polarized light).

6. Determination of Pasting Properties of Starch

A certain mass of a starch sample is weighed and then put in an aluminum box with deionized water for thorough stirring to prepare 25 g of a 6% (w/w, calculated based on a dry basis) suspension. The pasting properties of the starch is determined by using RVA, and a program is set based on Standard 2 in AACC.

7. Determination of Particle Size of Starch 100 mg of a starch (calculated based on a dry basis) is suspended in distilled water (10 mL) and then shaken continuously for about 10 min. A particle size analyzer (Mastersizer 2000) is slowly added for determination with the distilled water as a dispersant after the light intensity is stable. A particle refractive index, a particle absorption index and a dispersant refractive index are set to be 1.5, 0 and 1.33 respectively.

8. Observation of Starch Granules with a Scanning Electron Microscope

A small amount of a starch powder is fixed to a metal sample table with a conductive double-sided adhesive for metal spraying under vacuum and then observed under a scanning electron microscope with an accelerating voltage of 3.0 kV.

9. Scanning of Starch with a Fourier Transform Infrared Spectrometer

A starch sample and potassium bromide are accurately weighed and mixed in a ratio of 1:60 (w/w). 70 mg of a carefully ground mixture is pressed into a thin slice, and the slice is scanned with a Fourier transform infrared spectrometer in a transmission mode. Without considering the air background, the measurement range is 400-4,000 cm$^{-1}$, and the resolution is 4 cm$^{-1}$.

Example 1

Figure 1:
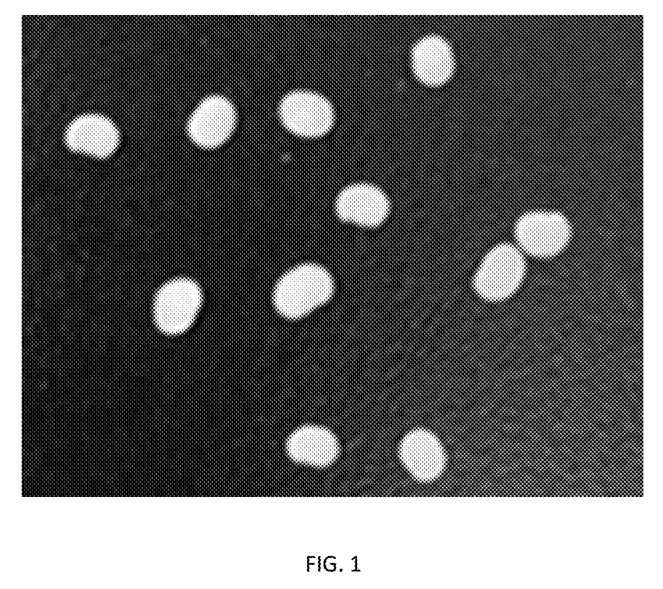
FIG. 1 is a diagram showing a decolorization effect of a complete duckweed turion.

A method for extracting the duckweed turion starch included the following steps.
(1) Preparation of the Decolorized Duckweed Turion A mature duckweed turion falling to the water bottom was harvested, most of root impurities in the turion were removed by rubbing, and the turion was dried at 40° C. for 3 h and then subjected to secondary purification removal with air separation equipment to remove remaining roots and thallus impurities to obtain a dry turion;

the dry turion was subjected to rehydration to obtain a rehydrated turion, where the rehydration was conducted according to a material-to-liquid ratio of 1:20 (w/v) at a temperature of 25° C. for 20 min; and the rehydrated turion was drained with a filter bag and then soaked in absolute ethanol, and after the soaking was completed, the turion was drained with a filter bag and then washed with sufficient water twice to obtain the decolorized duckweed turion (as shown in FIG. 1 as an effect figure), where the soaking was conducted according to a material-to-liquid ratio of 1:30 (w/v) at a temperature of 25° C. for 5 h.

(2) Extraction of the Duckweed Turion Starch

Figure 2:
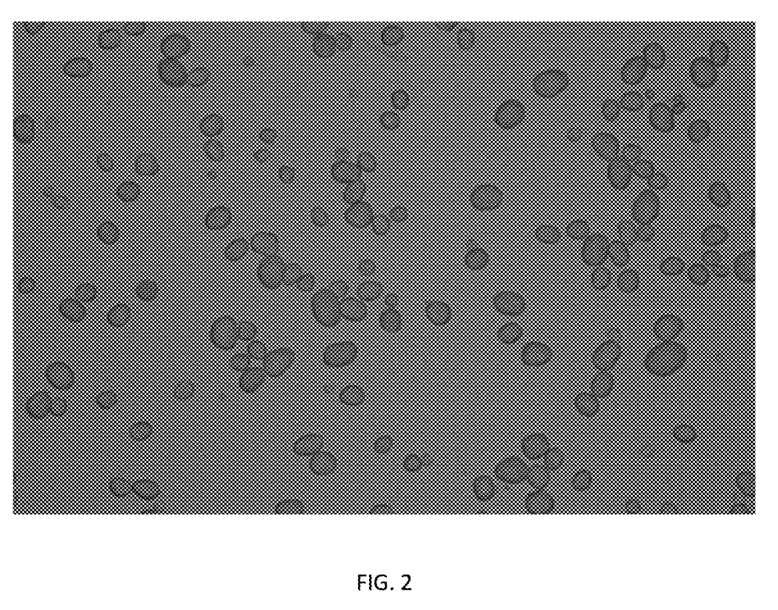
FIG. 2 is an optical microscope image of the duckweed turion starch.

The decolorized turion was drained and then put in a dispersion liquid (an ethanol solution with a concentration of 30% (v/v)) according to a material-to-liquid ratio of 1:25 (w/v);

extraction was conducted with a dispersion machine at a rotation speed of 13,000 rpm at a temperature of 25° C. for 10 min;

after the extraction, a dispersed solution was sieved with a 200-mesh sieve, a filtrate was gradually collected and then naturally settled, and a supernatant and a filter residue were continuously backfilled for dispersion; and all the collected filtrate was subjected to centrifugation at 3,500 rpm for 10 min to obtain a precipitate, the precipitate was subjected to washing centrifugation with a 50% ethanol solution three times (as shown in FIG. 2), and then the centrifuged precipitate was laid flat in a blast drying oven for drying at 40° C. until the moisture content was equal to or lower than 10%, and finally pulverized and sieved with a 100-mesh sieve to obtain the duckweed turion starch.

Performance of the obtained duckweed turion starch was tested, and test results were as follows.

FIG. 2 was an optical microscope image. From FIG. 2, it could be seen that duckweed starch granules were ellipsoidal.

Figure 3:
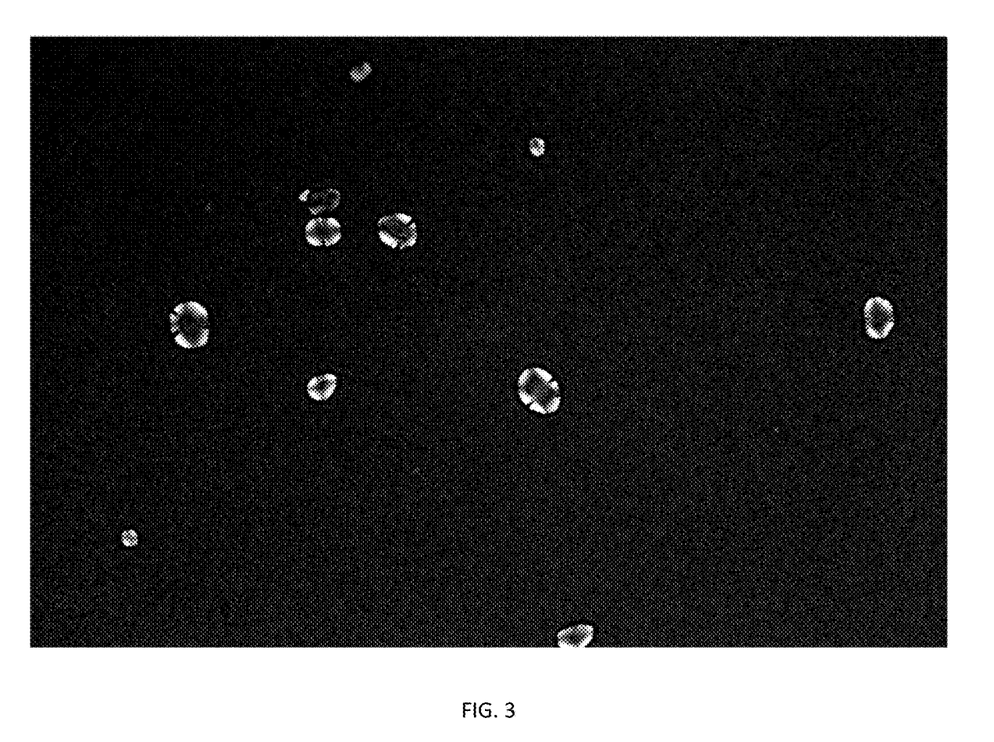
FIG. 3 shows test results of polarization crosses of the duckweed turion starch.

FIG. 3 showed test results of polarization crosses of the duckweed turion starch. From FIG. 3, it could be seen that the intersection of the polarization crosses of the duckweed turion starch was not in the center position, the crosses were thick, and some crosses even had more than one intersection. Black masses in the middles of the starch granules indicated that a part of the duckweed starch granules were semi-composite granules, implying that the starch granules were fused during growth.

Figure 4:
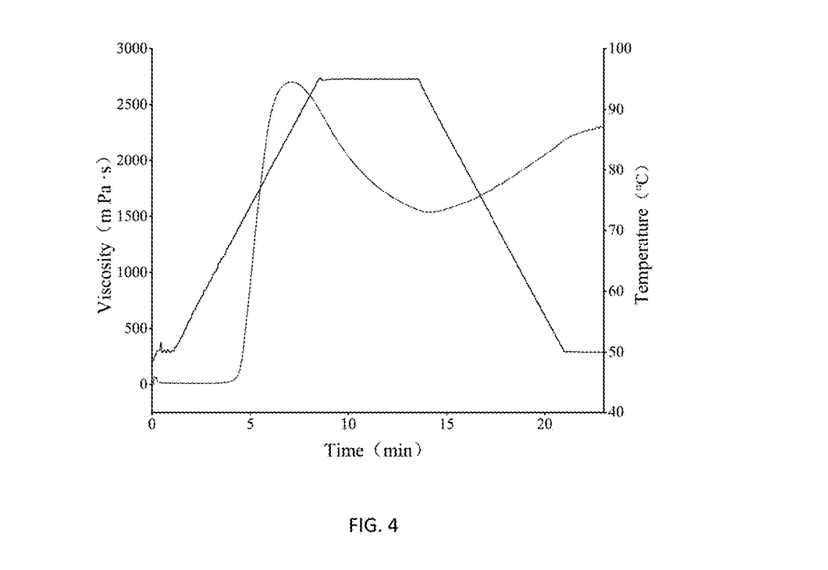
FIG. 4 shows test results of pasting properties of the duckweed turion starch.

FIG. 4 showed test results of pasting properties of the duckweed turion starch. From FIG. 4, it could be seen that the duckweed starch had a low gelatinization temperature and high viscosity. As the duckweed starch had a high breakdown value, a starch paste had low thermal stability. As the duckweed starch had a low retrogradation value, the starch paste had stable cold viscosity, indicating that retrogradation of the starch was difficult to occur.

Figure 5:
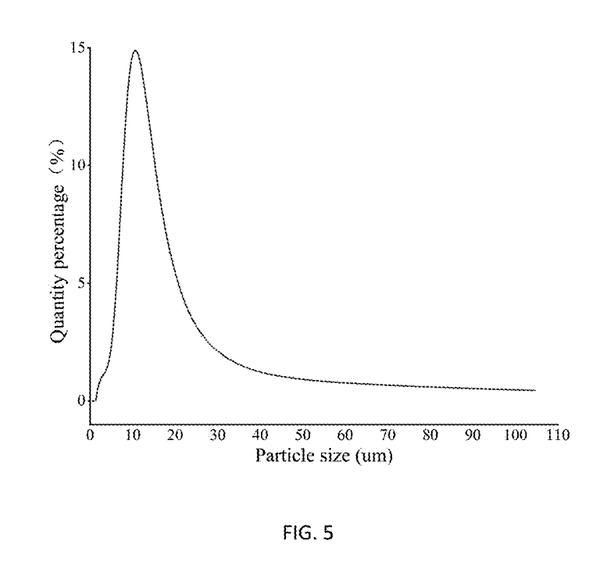
FIG. 5 shows test results of particle size distribution of the duckweed turion starch.

FIG. 5 showed test results of particle size distribution of the duckweed turion starch. From FIG. 5, it could be seen that the particle size of the duckweed turion starch was 5-25 um.

Example 2

A method for extracting the duckweed turion starch included the following steps.
(1) Preparation of the Decolorized Duckweed Turion A mature duckweed turion falling to the water bottom was harvested, most of root impurities in the turion were removed by rubbing, and the turion was dried at 45° C. for 2.5 h and then subjected to secondary purification with air separation equipment to remove remaining roots and thallus impurities to obtain a dry turion;

the dry turion was subjected to rehydration to obtain a rehydrated turion, where the rehydration was conducted according to a material-to-liquid ratio of 1:40 (w/v) at a temperature of 30° C. for 30 min; and the rehydrated turion was drained with a filter bag and then soaked in an ethanol solution with a concentration of 85%, and after the soaking was completed, the turion was drained with a filter bag and then washed with sufficient water twice to obtain the decolorized duckweed turion, where the soaking was conducted according to a material-to-liquid ratio of 1:5 (w/v) at a temperature of 50° C. for 1 h.

(2) Extraction of the Duckweed Turion Starch

The decolorized turion was drained and then put in a dispersion liquid (water) according to a material-to-liquid ratio of 1:25 (w/v), and cellulase was added into the dispersion liquid in an amount of 1.2 U/g substrate (turion);

extraction was conducted with a dispersion machine at a rotation speed of 8,000 rpm at a temperature of 50° C. for 50 min;

after the extraction, a dispersed solution was sieved with a 200-mesh sieve, a filtrate was gradually collected and then naturally settled, and a supernatant and a filter residue were continuously backfilled for dispersion; and all the collected filtrate was subjected to centrifugation at 3,000 rpm for 15 min to obtain a precipitate, the precipitate was subjected to washing centrifugation with a 70% ethanol solution three times, and then the centrifuged precipitate was laid flat in a blast drying oven for drying at 45° C. until the moisture content was equal to or lower than 10%, and finally pulverized and sieved with a 100-mesh sieve to obtain the duckweed turion starch.

Example 3

A method for extracting the duckweed turion starch included the following steps.

(1) Preparation of the Decolorized Duckweed Turion

A mature duckweed turion falling to the water bottom was harvested, most of root impurities in the turion were removed by rubbing, and the turion was dried at 40° C. for 5 h and then subjected to secondary purification with air separation equipment to remove remaining roots and thallus impurities to obtain a dry turion;

the dry turion was subjected to rehydration to obtain a rehydrated turion, where the rehydration was conducted according to a material-to-liquid ratio of 1:10 (w/v) at a temperature of 40° C. for 60 min; and the rehydrated turion was drained with a filter bag and then soaked in a solution including ethanol and acetone in a ratio of 7:3 (v/v), and after the soaking was completed, the turion was drained with a filter bag and then washed with sufficient water twice to obtain the decolorized duckweed turion, where the soaking was conducted according to a material-to-liquid ratio of 1:60 (w/v) at a temperature of 40° C. for 8 h.

(2) Extraction of the Duckweed Turion Starch

Figure 6:
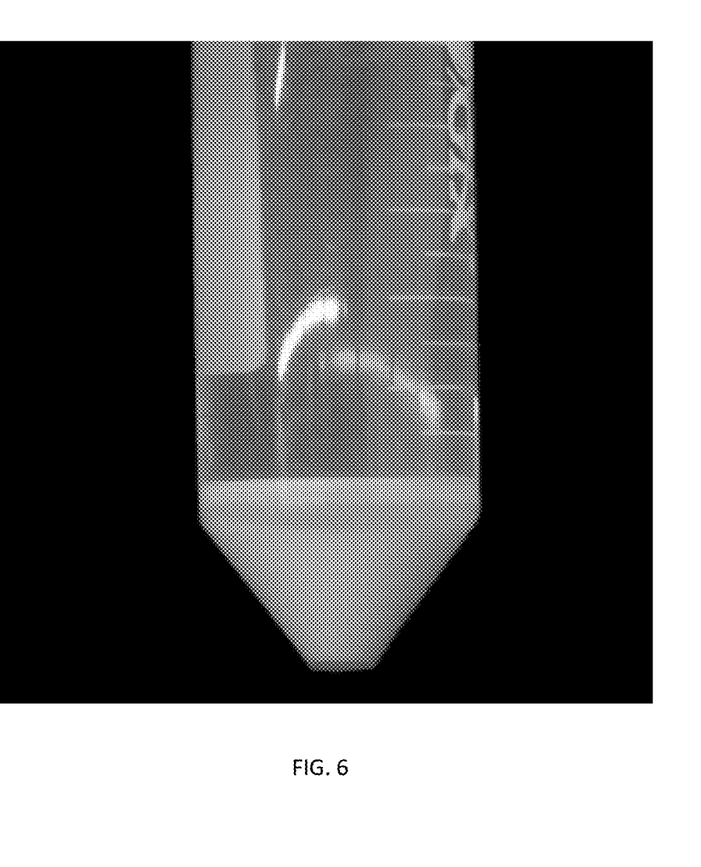
FIG. 6 is a diagram showing washing centrifugation of the duckweed turion starch.

The decolorized turion was drained and then put in a dispersion liquid (an ethanol aqueous solution with a concentration of 50% (v/v)) according to a material-to-liquid ratio of 1:60 (w/v);

extraction was conducted with a dispersion machine at a rotation speed of 15,000 rpm at a temperature of 40° C. for 15 min;

after the extraction, a dispersed solution was sieved with a 200-mesh sieve, a filtrate was gradually collected and then naturally settled, and a supernatant and a filter residue were continuously backfilled for dispersion; and all the collected filtrate was subjected to centrifugation at 4,500 rpm for 10 min to obtain a precipitate, the precipitate was subjected to washing centrifugation with a 50% ethanol solution three times, and then the centrifuged precipitate was laid flat in a blast drying oven for drying at 40° C. until the moisture content was equal to or lower than 8%, and finally pulverized and sieved with a 100-mesh sieve to obtain the duckweed turion starch (as shown in FIG. 6).

Performance of the obtained duckweed turion starch was tested, and test results were as follows.

Figure 7:
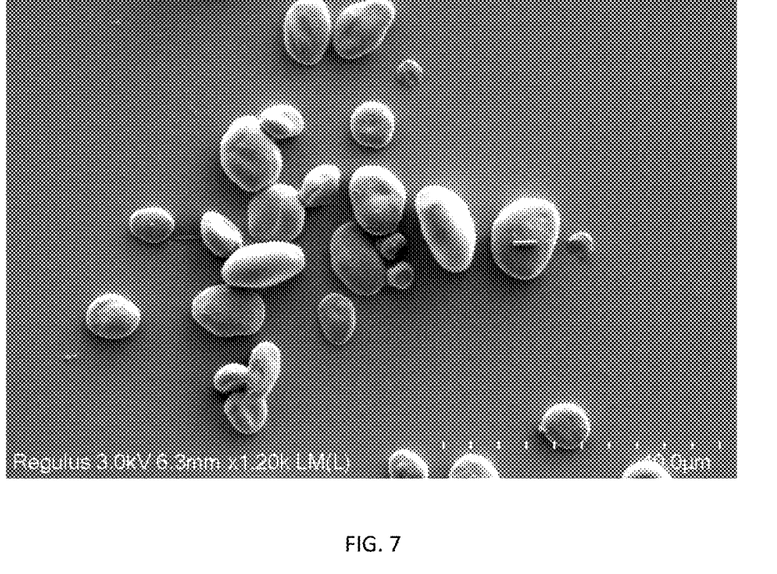
FIG. 7 is a morphological structure diagram of the duckweed turion starch.

FIG. 7 showed observation results of morphology of granules. From FIG. 7, it could be seen that duckweed thallus starch granules were the same as the duckweed turion starch in morphology and were ellipsoidal.

Figure 8:
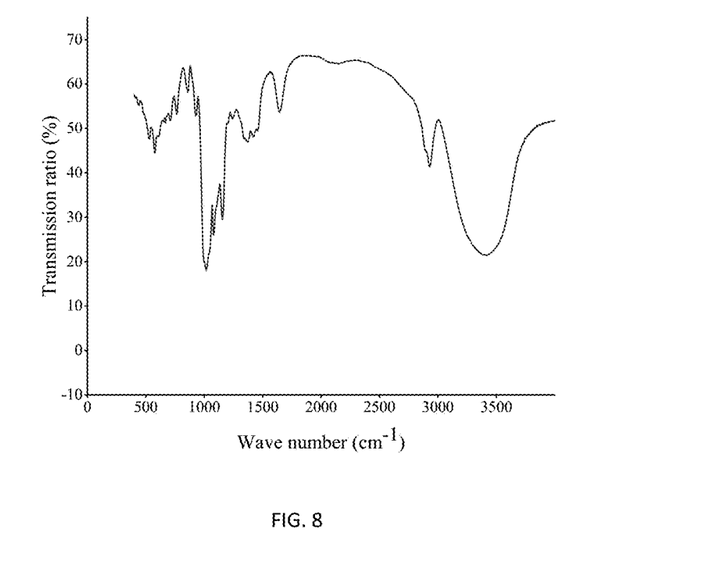
FIG. 8 shows test results of infrared spectra of the duckweed turion starch.

FIG. 8 showed Fourier transform infrared spectroscopy results of the starch. From FIG. 8, it could be seen that based on infrared spectra, a tested sample was clearly the starch.

Figure 9:
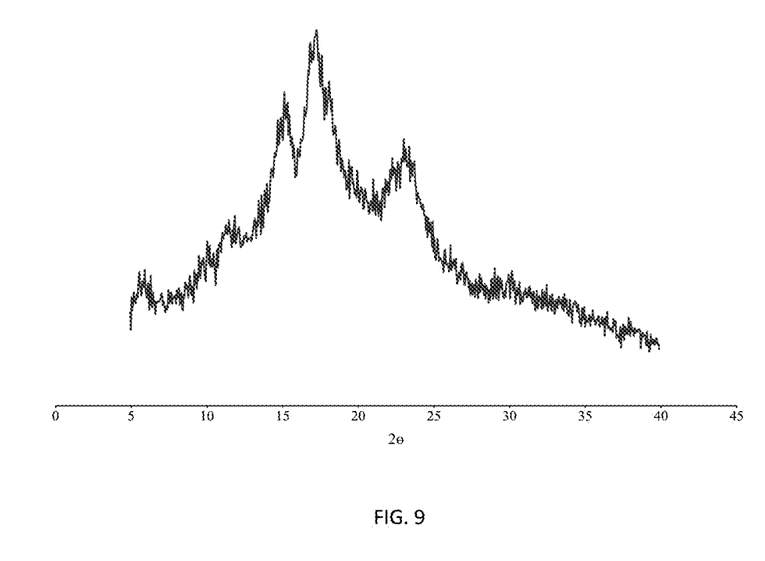
FIG. 9 shows test results of X-ray diffraction of the duckweed turion starch.
Figure 10:
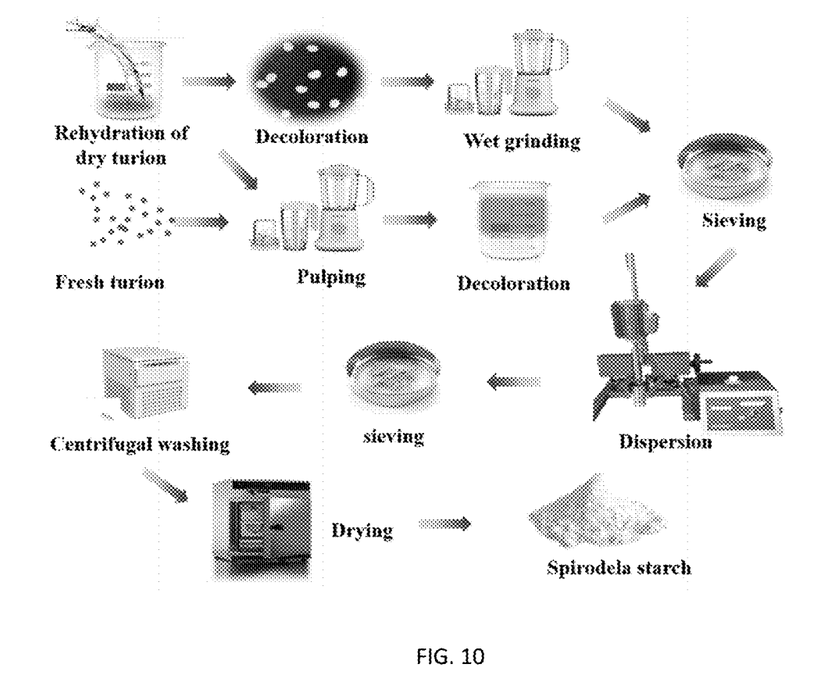
FIG. 10 is a flow diagram showing a method for extracting the duckweed turion starch.

FIG. 9 showed X-ray diffraction pattern results. From FIG. 9, it could be seen that the duckweed thallus starch is a C-type starch.

Example 4

A method for extracting the duckweed turion starch included the following steps.

(1) Preparation of the Decolorized Duckweed Turion

A mature duckweed turion falling to the water bottom was harvested, most of root impurities in the turion were removed by rubbing, and the turion was dried at 45° C. for 3 h and then subjected to secondary purification with air separation equipment to remove remaining roots and thallus impurities to obtain a dry turion;

the dry turion was subjected to rehydration to obtain a rehydrated turion, where the rehydration was conducted according to a material-to-liquid ratio of 1:20 (w/v) at a temperature of 25° C. for 30 min; and the rehydrated turion was drained with a filter bag and then soaked in absolute ethanol, and after the soaking was completed, the turion was drained with a filter bag and then washed with sufficient water twice to obtain the decolorized duckweed turion, where the soaking was conducted according to a material-to-liquid ratio of 1:30 (w/v) at a temperature of 25° C. for 5 h.

(2) Extraction of the Duckweed Turion Starch

The decolorized turion was drained and then put in a dispersion liquid (water) according to a material-to-liquid ratio of 1:40 (w/v);

extraction was conducted with a dispersion machine at a rotation speed of 12,000 rpm at a temperature of 25° C. for 15 min;

after the extraction, a dispersed solution was sieved with a 200-mesh sieve, a filtrate was gradually collected and then naturally settled, and a supernatant and a filter residue were continuously backfilled for dispersion; and all the collected filtrate was subjected to centrifugation at 3,500 rpm for 10 min to obtain a precipitate, the precipitate was subjected to washing centrifugation with a 70% ethanol solution three times, and then the centrifuged precipitate was laid flat in a blast drying oven for drying at 45° C. until the moisture content was equal to or lower than 8%, and finally pulverized and sieved with a 100-mesh sieve to obtain the duckweed turion starch.

Example 5

A method for extracting the duckweed turion starch included the following steps.

(1) Preparation of the Decolorized Duckweed Turion

A mature duckweed turion falling to the water bottom was harvested, most of root impurities in the turion were removed by rubbing;

a fresh turion was beaten, sieved with an 80-mesh sieve and then subjected to centrifugation at 3,500 rpm for 10 min to obtain a fresh turion slurry; and the fresh turion slurry was soaked in an ethanol aqueous solution with a concentration of 95%, and after the soaking was completed, the fresh turion slurry was subjected to centrifugation at 4,000 rpm for 8 min and then washed with sufficient water twice to obtain a decolorized fresh turion slurry, where the soaking was conducted according to a material-to-liquid ratio of 1:5 (w/v) at a temperature of 50° C. for 20 min.

(2) Extraction of the Duckweed Turion Starch

The decolorized fresh turion slurry was drained and then put in a dispersion liquid (water) according to a material-to-liquid ratio of 1:25 (w/v), and cellulase was added into the dispersion liquid in an amount of 1.2 U/g substrate (turion);

extraction was conducted with a dispersion machine at a rotation speed of 8,000 rpm at a temperature of 50° C. for 50 min;

after the extraction, a dispersed solution was sieved with a 200-mesh sieve, a filtrate was gradually collected and then naturally settled, and a supernatant and a filter residue were continuously backfilled for dispersion; and all the collected filtrate was subjected to centrifugation at 3,000 rpm for 15 min to obtain a precipitate, the precipitate was subjected to washing centrifugation with a 70% ethanol solution three times, and then the centrifuged precipitate was laid flat in a blast drying oven for drying at 45° C. until the moisture content was equal to or lower than 10%, and finally pulverized and sieved with a 100-mesh sieve to obtain the duckweed turion starch.

Performance of the decolorized duckweed turion raw materials and duckweed turion starches obtained in Examples 1 to 5 was tested, and test results were as follows.

TABLE 1

Test results of the decolorized duckweed resting bodies in Examples 1 to 5

| Example | Brightness L* | a* |
|---|---|---|
| 1 | 68.56 ± 1.80 | −1.38 ± 0.49 |
| 2 | 66.38 ± 1.64 | 0.84 ± 0.19 |
| 3 | 70.32 ± 2.03 | 0.94 ± 0.26 |
| 4 | 69.62 ± 2.38 | 0.63 ± 0.22 |
| 5 | 72.25 ± 1.35 | 0.21 ± 0.03 |

TABLE 2

Test results of the duckweed turion starches in Examples 1 to 5

| Example | Brightness L* | Whiteness | Extraction rate (%) | Purity (%) |
|---|---|---|---|---|
| 1 | 98.02 ± 1.25 | 94.7 ± 0.3 | 87.67 ± 1.05 | 96.24 ± 0.38 |
| 2 | 97.59 ± 2.06 | 94.4 ± 0.6 | 89.27 ± 0.93 | 95.98 ± 0.42 |
| 3 | 97.23 ± 2.36 | 95.2 ± 0.9 | 90.03 ± 0.85 | 96.54 ± 1.21 |
| 4 | 98.56 ± 2.15 | 95.5 ± 0.5 | 89.68 ± 0.36 | 96.34 ± 0.98 |
| 5 | 96.68 ± 3.12 | 94.5 ± 0.8 | 89.64 ± 0.62 | 95.96 ± 1.12 |

Example 6

With reference to a method in Example 6 in a patent "Composite Modified Cationic Starch and Preparation Method thereof" (ZL 201811581189.2), the duckweed turion starch prepared in Example 4 of the present disclosure was subjected to acid hydrolysis and etherification modification to obtain an acid hydrolyzed cationic starch. With reference to a method in Example 11 of the patent above, the acid hydrolyzed cationic starch was used in shampoo.

With reference to a determination method in "GB/T 29679-2013 Liquid Shampoo and Paste Shampoo", the foamability of the shampoo was determined. With reference to a method for testing the carding performance of shampoo in the patent "Composite Modified Cationic Starch and Preparation Method thereof", the combability of the shampoo was determined.

According to results, it was shown that the shampoo prepared from the acid hydrolyzed cationic starch met national standard requirements for indexes or reached a corresponding index level of commercially available shampoo.

Specific test results were as follows.

TABLE 3

Test results of Example 6

| Sample | Foam height (mm) | Wet combing work (kJ) | Dry combing work (kJ) |
|---|---|---|---|
| Acid hydrolyzed cationic starch shampoo | 118 ± 2 | 13.15 ± 0.07 | 7.32 ± 0.11 |
| National standard requirements | ≥50 | — | — |
| Commercial level | — | <13.25 | <7.79 |

Note:
The "—" in the table indicated that there were no provisions.

Example 7

The temperature of decolorization soaking in Example 1 was changed to 45° C., others conditions were the same as those in Example 1, and the duckweed turion starch was obtained.

Example 8

A decolorization soaking liquid in Example 2 was changed to a 30% (v/v) acetone solution, others conditions were the same as those in Example 2, and the duckweed turion starch was obtained.

Example 9

The rotation speed of the dispersion machine in Example 3 was changed to 5,000 rpm, others conditions were the same as those in Example 3, and the duckweed turion starch was obtained.

Performance of the duckweed turion starches obtained in Examples 7 to 9 was tested, and test results were shown in the following Table 4.

TABLE 4

Test results of the duckweed turion raw materials and starches in Example 7 to 9

| | Decolorized duckweed turion | | Duckweed turion starch | | | |
|---|---|---|---|---|---|---|
| Example | Brightness L* | a* | Brightness L* | Whiteness | Extraction rate (%) | Purity (%) |
| 7 | 58.46 ± 2.00 | −3.83 ± 1.03 | 90.12 ± 2.62 | 89.6 ± 0.4 | 87.58 ± 0.97 | 94.52 ± 0.42 |
| 8 | 57.35 ± 1.98 | −8.32 ± 2.52 | 88.23 ± 1.36 | 85.35 ± 0.6 | 86.63 ± 0.86 | 93.78 ± 0.85 |
| 9 | 70.45 ± 2.36 | 1.02 ± 0.66 | 82.38 ± 2.34 | 78.23 ± 0.5 | 72.34 ± 0.73 | 68.24 ± 0.38 |

Comparative Example 1

A fresh turion was directly extracted without the steps of drying, rehydration and decolorization in Example 1, others conditions were the same as those in Example 1, and the duckweed turion starch was obtained.

Comparative Example 2

A dry turion was directly decolorized and extracted without the step of rehydration in Example 1, others conditions were the same as those in Example 1, and the duckweed turion starch was obtained.

Comparative Example 3

A dry turion was directly decolorized and extracted without the steps of drying and rehydration in Example 1, others conditions were the same as those in Example 1, and the duckweed turion starch was obtained.

Comparative Example 4

The step of dispersion in Example 2 was changed to a step that a decolorized turion was drained and then put in a dispersion liquid (water) according to a material-to-liquid ratio of 1:25 (w/v), and cellulase was added into the dispersion liquid in an amount of 1.2 U/g substrate (turion) for pulverization and beating. Others conditions were the same as those in Example 2, and the duckweed turion starch was obtained.

Comparative Example 5

A fresh turion was treatment by liquid nitrogen quick freezing for 24 h without the steps of drying, rehydration and decolorization in Example 3, unfrozen at room temperature and then pulverized (sieved with a 200-mesh sieve). Others conditions were the same as those in Example 3, and the duckweed turion starch was obtained.

Performance of the duckweed turion starches obtained in Comparative Examples 1 to 5 was tested, and test results were shown in the following Table 5.

TABLE 5

Test results of the duckweed turion starches in Comparative Examples 1 to 5

| Comparative Example | Brightness $L^*$ | Whiteness | Extraction rate (%) | Purity (%) |
|---|---|---|---|---|
| 1 | 63.03 ± 2.11 | 60.1 ± 1.1 | 42.47 ± 1.72 | 83.39 ± 0.33 |
| 2 | 68.21 ± 1.26 | 56.2 ± 0.8 | 40.15 ± 0.78 | 67.82 ± 0.54 |
| 3 | 67.45 ± 2.12 | 58.8 ± 1.0 | 40.02 ± 1.21 | 80.58 ± 0.47 |
| 4 | 89.02 ± 1.13 | 72.1 ± 0.9 | 39.98 ± 0.49 | 81.06 ± 0.67 |
| 5 | 65.10 ± 0.46 | 69.5 ± 1.3 | 34.04 ± 0.71 | 76.91 ± 0.61 |

Comparative Example 6

A method for extracting the duckweed turion starch included the following steps.

(1) Preparation of the Decolorized Duckweed Turion

A mature duckweed turion falling to the water bottom was harvested, most of root impurities in the turion were removed by rubbing, and the turion was dried at 40° C. for 4 h and then subjected to secondary purification with air separation equipment to remove remaining roots and thallus impurities to obtain a dry turion;

the dry turion was pulverized and sieved with an 80-mesh sieve to obtain a turion powder; and the turion powder was soaked in absolute ethanol, after the soaking was completed, the turion powder was subjected to centrifugation at 3,500 rpm for 10 min to obtain a precipitate, and then the precipitate was washed with sufficient water twice to obtain the decolorized duckweed turion powder, where the soaking was conducted according to a material-to-liquid ratio of 1:50 (w/v) at a temperature of 25° C. for 10 h.

(2) Extraction of the Duckweed Turion Starch

The decolorized turion powder was subjected to centrifugation at 3,500 rpm for 10 min and then put in water according to a material-to-liquid ratio of 1:35 (w/v);

extraction was conducted with a dispersion machine at a rotation speed of 12,000 rpm at a temperature of 25° C. for 10 min;

after the extraction, a dispersed solution was sieved with a 200-mesh sieve, a filtrate was gradually collected and then naturally settled, and a supernatant and a filter residue were continuously backfilled for dispersion; and all the collected filtrate was subjected to centrifugation at 3,500 rpm for 10 min to obtain a precipitate, the precipitate was subjected to washing centrifugation with a 70% ethanol solution three times, and then the centrifuged precipitate was laid flat in a blast drying oven for drying at 45° C. until the moisture content was equal to or lower than 10%, and finally pulverized and sieved with a 100-mesh sieve to obtain the duckweed turion starch.

Performance of the obtained decolorized duckweed turion was tested, and test results were as follows. The brightness $L^*$ was 56.32±2.36, and $a^*$ was −12.35±3.22. Performance of the obtained duckweed turion starch was tested, and test results were as follows. The brightness $L^*$ was 88.35±1.36, the whiteness was 76.3±0.5, the extraction rate was 85.36±1.33%, and the purity was 77.92±0.63%.

What is claimed is:

1. A method for extracting starch from duckweed turion, comprising:
    (a) obtaining duckweed turion,
    (b) drying and rehydrating the duckweed turion to obtain a rehydrated turion,
    (c) soaking the rehydrated duckweed turion in a solvent,
    (d) washing and filtering the duckweed turion to obtain decolorized duckweed turion,
    (e) extracting the decolorized duckweed turion in a dispersion liquid at a rotation speed of 6,000 to 18,000 rpm at 25° C. to 50° C. for 5 to 60 minutes, and
    (f) filtering, centrifuging, washing, and drying the duckweed turion to obtain the duckweed turion starch,
    wherein the duckweed turion is selected from one or more of the following: *S. polyrhiza* ZH0196, *L. aequinoctialis* 6002, *L. aequinoctialis* LC33, *L. punctata* LC06, *S. polyrhiza* LC15, and *Landoltia* OT, and
    wherein at least one or more of a cellulase, a hemicellulose, or a pectinase is added into the dispersion liquid in an amount of 0.5 U/g to 3.2 U/g, 0.6 U/g to 2.4 U/g, and 0.2 U/g to 1.3 U/g, respectively.

2. The method according to claim 1, wherein the rehydrating in step (b) is conducted at a material-to-liquid ratio of 1:(5-100) in g/mL, at a temperature of 25° C. to 50° C., and for 20 minutes to 120 minutes.

3. The method according to claim 1, wherein the solvent of step (c) has a concentration of 40 to 100% (v/v) and is selected from one or more of ethanol, acetone, petroleum ether, and dimethyl sulfoxide.

4. The method according to claim 1, wherein the soaking of step (c) is conducted at a material-to-liquid ratio of 1:(10-100) in g/mL, at a temperature of 25° C. to 50° C., and for 4 hours to 24 hours.

5. The method according to claim 1, wherein the dispersion liquid comprises water, ethanol and acetone.

6. The method according to claim 1, wherein the extraction is conducted at a material-to-liquid ratio of 1:(10-100) in g/mL.

7. The method according to claim 1, further comprising:
- extracting the decolorized duckweed turion in the dispersion liquid with a material-to-liquid ratio of 1:(10-100) (w/v) in a dispersion machine at a rotation speed of 6,000 rpm to 18,000 rpm, at a temperature of 25° C. to 50° C., for 5 minutes to 60 minutes, to obtain an extracted material liquid;
- filtering the extracted material liquid,
- backfilling and dispersing on a filter residue several times, collecting a filtrate several times;
- performing natural settling and centrifugation on the collected filtrate to obtain a crude starch, and
- washing, drying, grinding, and sieving the crude starch to obtain the duckweed turion starch.

* * * * *